S. G. ELEK.
Machine for Testing the Quality of Rolling-Stock, &c.
No. 199,046. Patented Jan. 8, 1878.
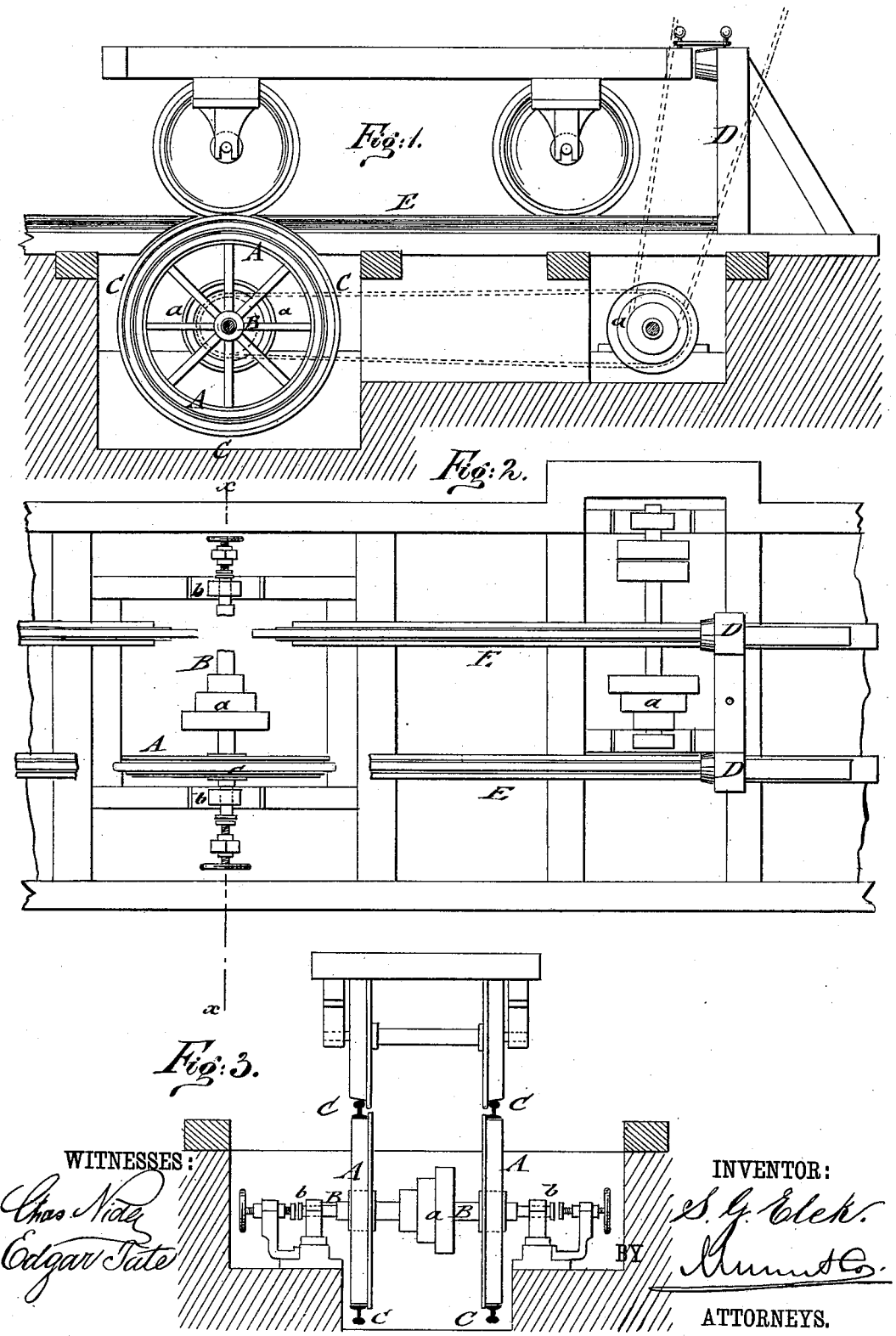

UNITED STATES PATENT OFFICE.

SZENT-GYÖRGYI ELEK, OF BUDA-PEST, AUSTRO-HUNGARY.

IMPROVEMENT IN MACHINES FOR TESTING THE QUALITY OF ROLLING-STOCK, &c,

Specification forming part of Letters Patent No. 199,046, dated January 8, 1878; application filed December 3, 1877.

*To all whom it may concern:*

Be it known that I, SZENT-GYÖRGYI ELEK, of Buda-Pest, in the Empire of Austro-Hungary, have invented a new and Improved Machine for Testing the Quality of Rolling-Stock, &c., of which the following is a specification:

The testing of materials used in the working of a railway, such as rails, wheels, axles, journals, brasses, springs, lubricators, and the like, has hitherto been generally performed, either mechanically or chemically, under certain conditions. All these methods give certain results, upon which the wearing capabilities of the said articles may be calculated. These results, however, differ generally to a great extent from the real wearing qualities of the materials when tested by actual working. The testing of materials, however, by actual work is not easily done, and much time and trouble have to be expended if the results are to be at all satisfactory.

In order that the testing of railway rolling-stock, &c., may be performed at any required place, where some suitable power is at hand, and the materials subjected to the same mechanical wear, as they would be when in use, the hereinafter-described machine has been invented, which I denominate a "rotary railway-rail."

By the use of this machine all railway materials may be tested, and made to undergo exactly the same mechanical wear as they would when in actual use, and, besides, the effect can even be increased, if required. The testing can be effected in a short time, and the effect of the testing constantly observed.

The rotatory rail furnishes results from which the actual value of the materials tested may be accurately ascertained before they are put into use.

The practical advantages of such a testing-machine consist in the facility of ascertaining whether the materials are furnished according to contract, of deciding between different forms of construction, of testing lubricators of different construction, of observing the true causes of the heating of axles, and of suggesting the best means for avoiding the same, and of its applications for other analogous purposes.

The invention consists, essentially, of endless rails, supported on disks of a horizontal revolving axle, and so arranged that the wheels of any railway-car may be placed on the rotatory rails, and revolved by the same at any desired speed, the car or the wheels, if the latter alone are to be tested, being retained in suitable manner, in fixed position.

In the accompanying drawings, Figure 1 represents a sectional side elevation of my improved rotatory rail or machine for testing the quality of rolling-stock; Fig. 2, a plan view, and Fig. 3 a vertical transverse section of the same on line *x x*, Fig. 2.

Similar letters of reference indicate corresponding parts.

The machine consists of two disks, A A, that are fixed to a common axle, B, that is revolved by suitable power and transmitting-belts and speed-pulleys *a* in horizontal bearings *b*.

On the outer periphery of the disks A A are fastened, by wedged screw-bolts and anchor-screws, or in other suitable manner, endless rails C, on which the truck-wheels of a railway-car are placed, they being, however, prevented from moving away by coupling the car-frame to fixed supports or standards D with suitable buffers or cushioning arrangements, so that the wheels are driven by the endless rails as the latter are revolved by the driving-belt. In this manner the same effect is produced on the wheels as if they were rotating over a fixed line of rails.

The rotatory rails are arranged, preferably, below the level of the ground, and a regular track, E, arranged in connection therewith, that leads to the posts or standards D, and is on a level with the uppermost point of the endless rails, the track being broken out for these rails, as shown in Figs. 1 and 2, so as to admit the convenient placing in position of rolling-stock for testing. During the testing such irregularities as are always met with on the track, and which have the effect of causing the rolling-stock to wear out quicker than if they were not there, may be produced by artificial means— as, for instance, the brakes may be applied constantly or intermittently, or the wheels unequally weighted, or the shocks caused by the running of the wheels over rail-joints, or by the widening of the gage, or by the bulging and bending of rails reproduced, and faults and defects in the axle-boxes, bearings, &c., provided so as to obtain, in positive manner, reliable results as to the real qualities of the materials used.

Whenever the test is desired in a short time, the machine may be run at a proportionately higher speed. When it is desired to make trials of materials at places where rolling-stock is not at hand, the wheels, with their axles, journal-boxes, pedestals, springs, &c., only may be placed upon the apparatus and weighted to any desired extent. For this purpose the bed-plate is provided with upright and connected side standards and a suitably-guided hanging frame, to which any pair of wheels can be introduced. The machine may also be employed for the testing of wheels, tires, and railway-rails. For wheels a continual braking and greater driving power is required, while for rails and tires a large pair of wheels should be placed into the tester, without springs, and then heavily weighted, so as to act upon them in the same manner as a locomotive running over them. These tests may be extended, varied, and adapted to the special materials and cases, as required.

A registering device is connected with the axle of the testing-rails, to record the number of revolutions as a basis for calculations, a similar registering-instrument being applied to the axle of the wheels to be tested when it is desired to prove the existence of slipping between the tester and the wheels.

Having thus described my invention, and the manner in which the same is to be carried out in practice, I claim as new and as my invention—

1. A machine for testing railway rolling-stock and materials, consisting, essentially, of endless or rotatory rails, placed on supporting-disks of a revolving axle, and applied to the car-wheels, substantially as and for the purpose set forth.

2. A machine for testing railway rolling-stock and materials, consisting of endless or rotatory rails, revolved by suitable power, and of a railway-track on a level with the top of the rotatory rails, and of suitable devices for retaining the wheels in position for the action of the rotatory rails, substantially as and for the purpose set forth.

In testimony that I claim the foregoing I have hereunto set my hand.

SZENT-GYÖRGYI ELEK,
*Chief Engineer of the Royal
Hungarian Railway.*

Witnesses:
ANTON KUNWALD,
*Ober-Ingeneur.*
LENZ TÁNOS,
*Beamte d. k. u. Staatsbohnen.*